United States Patent [19]
Yoshida et al.

[11] Patent Number: 5,343,077
[45] Date of Patent: Aug. 30, 1994

[54] ELECTRIC POWER SUPPLY CONTROL DEVICE FOR VEHICLE

[75] Inventors: Susumu Yoshida, Wako; Munemitsu Ebihara, Miyazaki; Tsutomu Kurita, Miyazaki; Masahiko Sueyoshi, Miyazaki, all of Japan

[73] Assignees: Honda Giken Kogyo KK, Tokyo; Honda Lock MFG. Co., Ltd., Miyazaki, both of Japan

[21] Appl. No.: 882,603

[22] Filed: May 13, 1992

Related U.S. Application Data

[63] Continuation of Ser. No. 541,118, Jun. 20, 1990, Pat. No. 5,124,565.

[30] Foreign Application Priority Data

Jun. 20, 1989 [JP] Japan .................. 1-157122
Aug. 31, 1989 [JP] Japan .................. 1-226877

[51] Int. Cl.$^5$ ............ B60R 25/02; B60R 25/04; B62H 5/02
[52] U.S. Cl. ............................ 307/9.1; 70/252; 70/256; 180/287; 307/10.3; 340/825.31
[58] Field of Search .................. 307/9.1–10.6; 361/172; 340/825.69, 825.72, 825.3–825.4; 180/286, 287; 70/252, 256

[56] References Cited

U.S. PATENT DOCUMENTS

| | | | |
|---|---|---|---|
| 4,638,882 | 1/1987 | Sato | 180/287 |
| 4,763,121 | 8/1988 | Tomoda et al. | 340/825.4 |
| 4,965,460 | 10/1990 | Tanaka et al. | 307/10.2 |
| 4,965,461 | 10/1990 | McRoberts et al. | 307/10.2 |
| 4,973,958 | 11/1990 | Hirano et al. | 340/825.69 |
| 5,124,565 | 6/1992 | Yoshida et al. | 307/9.1 |

FOREIGN PATENT DOCUMENTS 63-199186 8/1988 Japan .

*Primary Examiner*—A. D. Pellinen
*Assistant Examiner*—Richard T. Elms
*Attorney, Agent, or Firm*—Longacre & White

[57] ABSTRACT

An electric power supply control device for a vehicle comprises a lock actuator for driving actuators of the vehicle and an operation switch for outputting all operation instruction signal to the lock actuator. A circuit for vehicle running system for actuating an engine of the vehicle and a steering lock circuit for actuating the steering lock actuator In a locking direction are connected, exclusively with each other, to a power supply circuit. Wireless communication is conducted between a driver's transceiver and the vehicle when the vehicle engine is stopped and the power supply circuit therefor remains on, to automatically disconnect the power supply circuit.

1 Claim, 8 Drawing Sheets

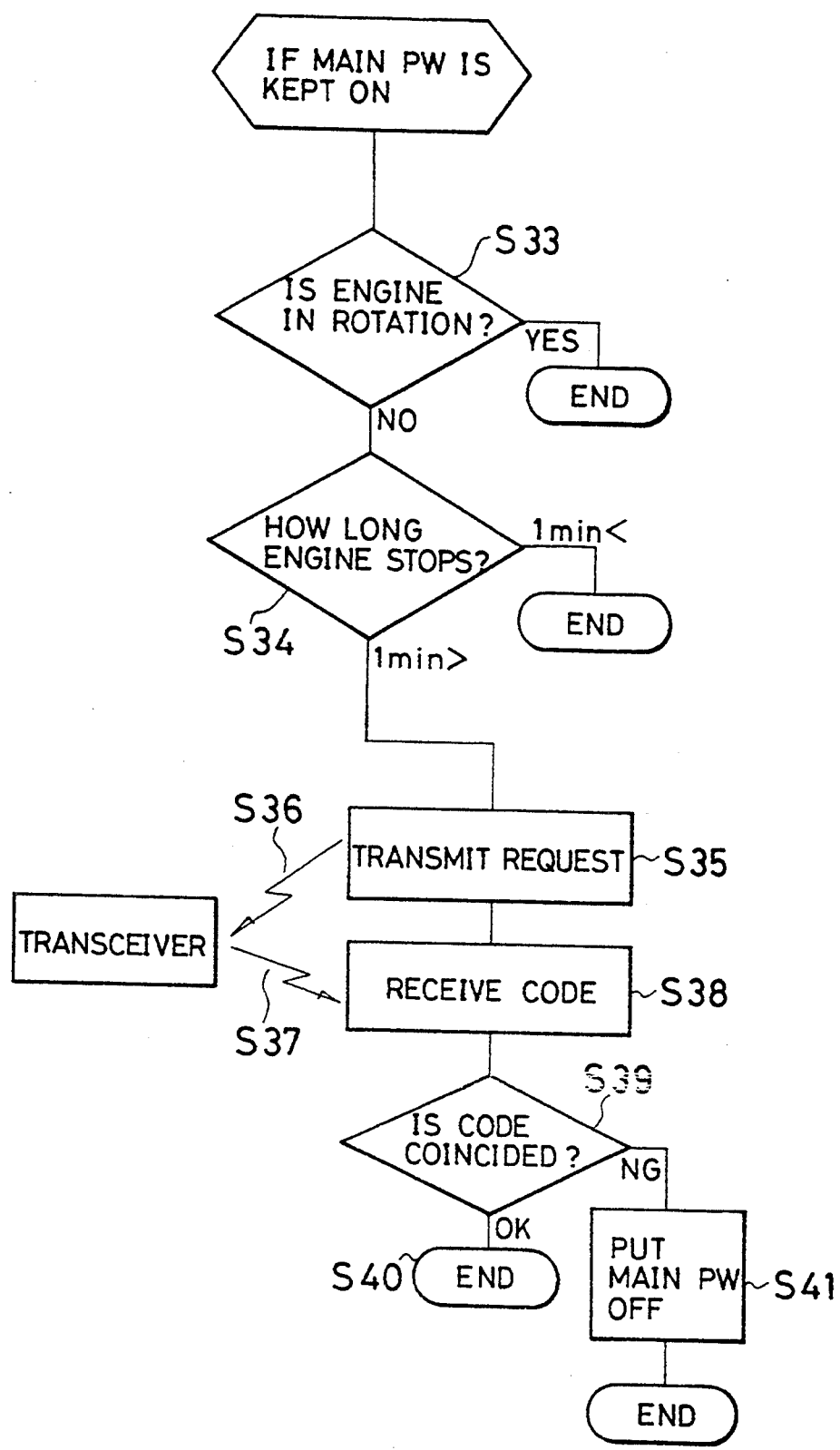

ELECTRIC POWER SUPPLY CONTROL DEVICE FOR VEHICLE

This is a continuation of application Ser. No. 07/541,118, filed Jun. 20, 1990, now U.S. Pat. No. 5,124,565.

BACKGROUND OF THE INVENTION

1. Field of the Invention

The present invention concerns an electric power supply control device for a vehicle and, in particular, it relates to an electric power supply control device for a vehicle that electrically controls actuators of the vehicle such as a steering lock device and an engine ignition device.

2. Description of the Prior Art

Conventional steering lock devices for motorcycles etc. have been actuated by, for example, rotating a mechanical key used in common with a key switch for turning on or off an electric power supply circuit that includes a starting circuit. When operating a vehicle having such a steering lock device, it is necessary to first unlock the steering lock device, turn the electric power supply circuit to on, press a starting switch to start the engine. Accordingly, the operation of the steering lock device tends to be complicated.

In view of the above, the present inventors have contemplated utilizing electromotive actuators, etc. for the steering lock device to control the actuators with a simple switching operation.

Further, a device of controlling an electric power supply system off vehicle actuators by the input off code signal is disclosed in, for example, Japanese Patent Laid-Open Sho 63-199186. However, if an engine ignition circuit, etc. is inactivated not by means of usual off operation to a main electric power supply of the device but by directly actuating an emergency stopping means such as an engine kill switch or by accident (engine failure, etc.), the main electric power supply will still remain on after the engine stops. Then, if the driver while forgets to turn off the main power supply when he leaves the vehicle, electric power is consumed wastefully by the various electric devices such as lamps equipped in the vehicle.

The present invention has also been intended to avoid the consumption of battery power in such a case.

OBJECT OF THE INVENTION

It is, accordingly, a first object of the present invention to provide an electric power supply control device for a vehicle that is capable of completing an engine starting operation in a shorter period of time by a steering lock device using an electromotive actuator, etc. while possessing a Function equivalent to that of a conventional key switch integrated with a steering lock device thereby providing a further improved ease of operation, as well as controlling a steering lock actuator and an engine running actuator independently of and exclusively, to each other.

Another object of the present invention is to provide an electric power supply control device for a vehicle of a code signal coincidence type that is capable of automatically turning off a main electric power supply if the main electric power supply should happen to remain on for more than a certain period of time after the engine has been stopped.

SUMMARY OF THE INVENTION

The first object of the present invention can be attained in accordance with the present invention in an electric power supply control device for a vehicle comprising:

a lock actuator for driving a steering lock device of a vehicle and an operation switch for outputting an operation instruction signal to the lock actuator, in which the lock actuator is actuated by a signal from the operation switch, and a circuit for vehicle running system for actuating an engine of the vehicle and a steering lock circuit for actuating the lock actuator in a locking direction are connected, exclusively with each other, to an electric power supply circuit.

In accordance with the constitution described above, locking and unlocking operations to the steering lock device can be conducted easily by the operation to the operation switch, and the operation for the engine and the locking operation to the lock actuator can not be conducted simultaneously with each other.

In a specific embodiment of the present invention, the electric power supply control device further comprises:

an operation switch disposed on the side of the vehicle for transmitting a predetermined request signal by manual operation, a predetermined code signal transmission means carried by a driver for transmitting a predetermined inherent code signal upon receiving the predetermined request signal described above and a comparison means disposed on the side of the vehicle for receiving the predetermined inherent code signal and comparing it with a predetermined set code, in which the power supply circuit and the circuit for the vehicle running system are connected, as well as the power supply circuit and the steering lock circuit are disconnected from each other when the predetermined code signal coincides with the predetermined set code.

In this specific embodiment, when the manual switch disposed on the vehicle is operated, the code transmitter carried by the driver and the receiver disposed on the vehicle conduct communication automatically between each other, and coincidence between both of the code signals are confirmed by the code comparison means disposed on the vehicle, by which it can be automatically judged whether a person who manipulates the manual switch is a right driver or not.

In another specific embodiment of the present invention, a circuit for lighting-up a parking lamp of the vehicle and the steering lock circuit are interlocked with each other.

In this embodiment, the steering lock actuator is locked automatically when the parking lamp is lighted-up.

In a further specific embodiment of the present invention, a steering angle sensor for detecting the steering position of a vehicle steering handle is further disposed and the lock actuator is operated upon interlocking of the signal from the operation switch and the signal from the steering angle sensor.

According to this embodiment, since the condition regarding the steering angle is further incorporated to the control operation, it is easy for a driver to manipulate the lock without taking care of the states of the lock.

Another object of the present invention can be attached in accordance with the present invention in an electric power supply control device for a vehicle, in which a main power supply disposed on a vehicle is turned on by wireless mode communication between a portable transceiver and the vehicle, wherein wireless mode communication is conducted between the portable transceiver and the vehicle when the main power supply remain on and an engine is in a stopped state, and the main power supply is turned off if normal wireless mode communication can not be conducted normally over a predetermined period of time continuously.

In accordance with the feature of the present invention, if a driver forgets to disconnect the main power supply when he leaves the vehicle in a case where the engine is stopped directly by the operation to a kill switch or by accident, the main power supply can be automatically turned off and, accordingly, wasteful power consumption can be avoided.

In a specific feature of this invention, having the foregoing constitution, the wireless mode communication is conducted on every predetermined time interval.

DESCRIPTION OF THE ACCOMPANYING DRAWINGS

These and other objects, as well as advantageous features of the present invention will be understood from the detailed descriptions for preferred embodiments thereof with reference to the accompanying drawings, wherein FIG. 1 is a perspective view for handle bars of a motorcycle to which the first invention of the present application is applied;

Figure 10:
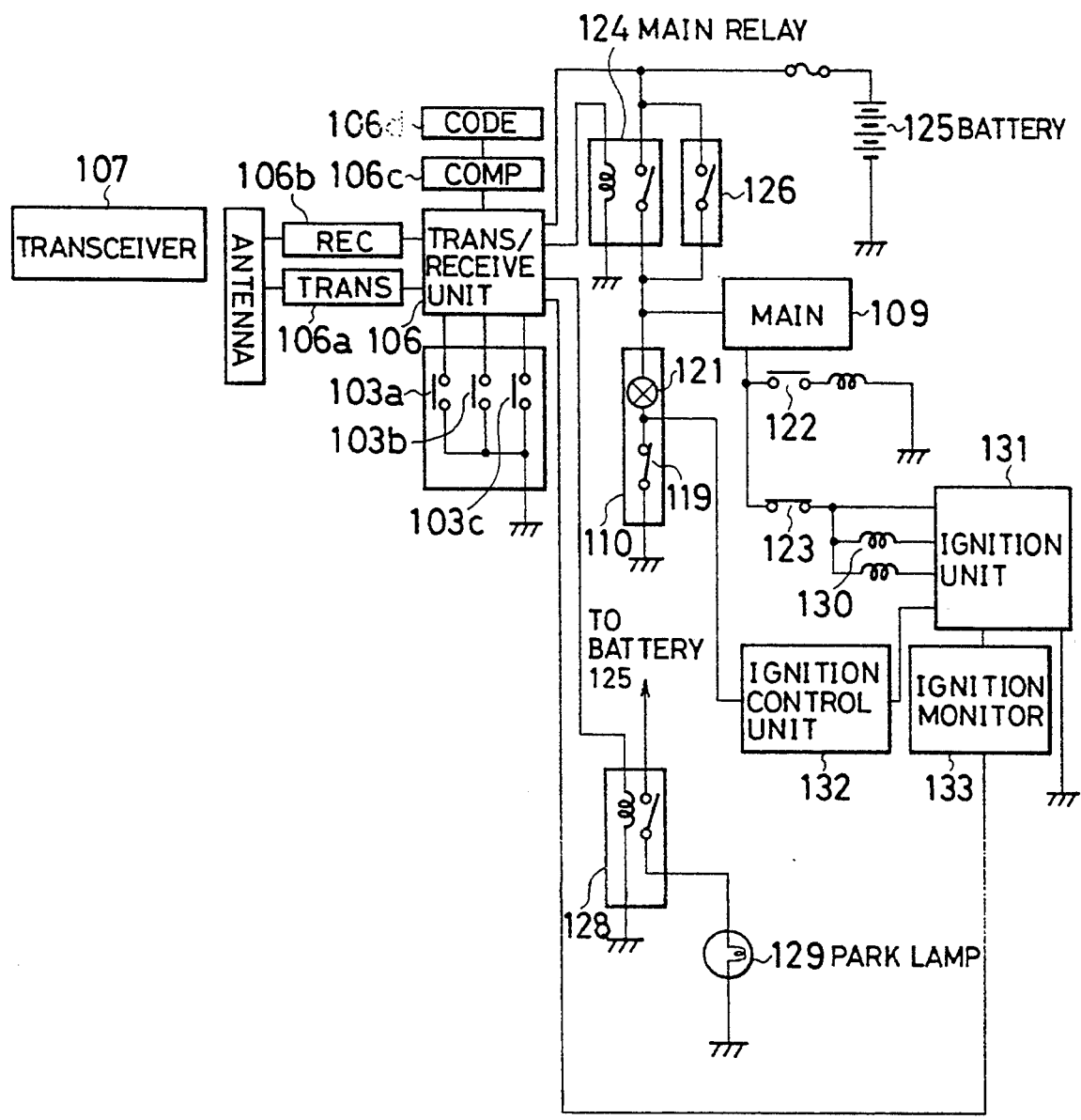
FIG. 10 is a block diagram illustrating the outline for one embodiment of the electric power supply control device for a vehicle according to the second invention.
Figure 11A:
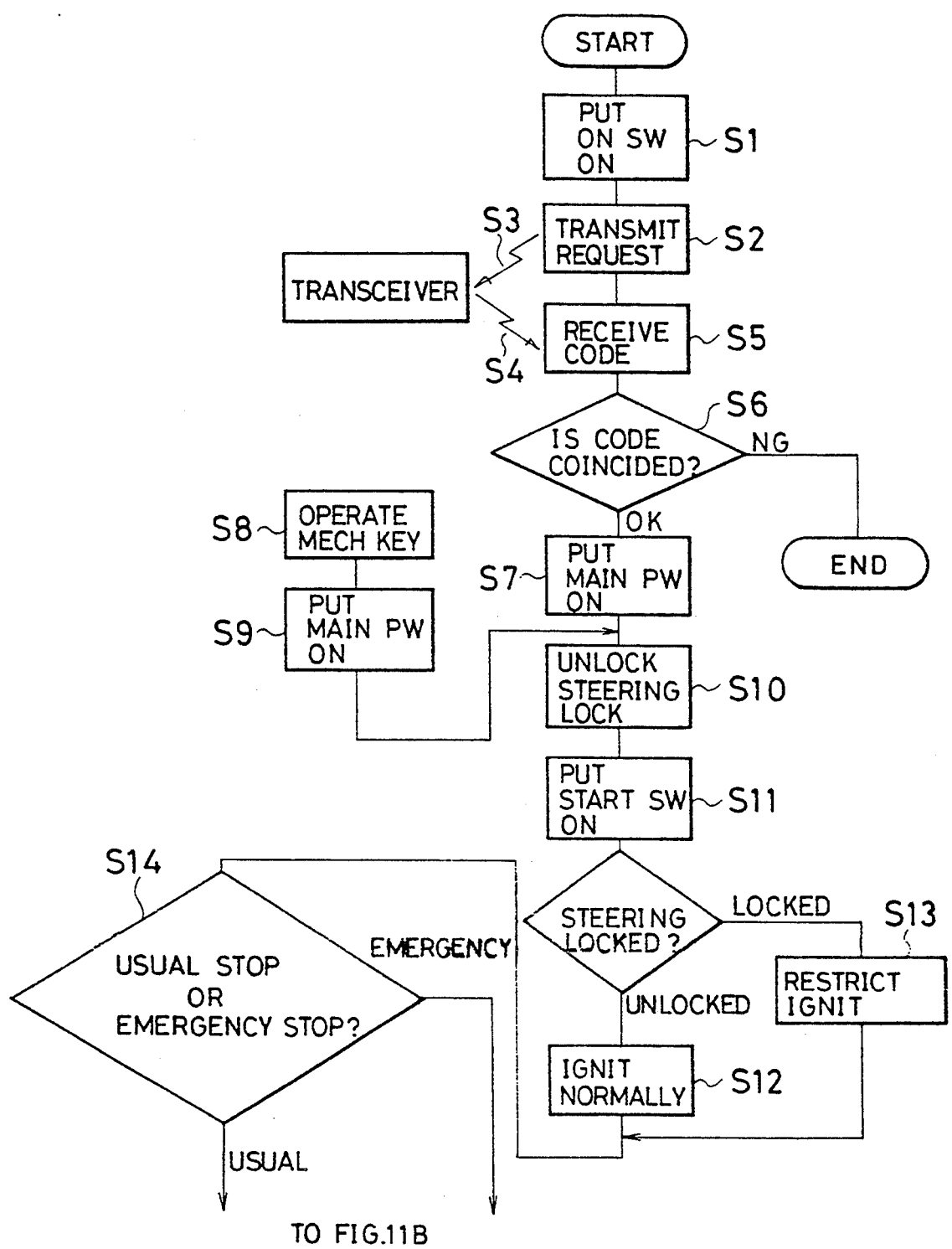
Figure 11B:
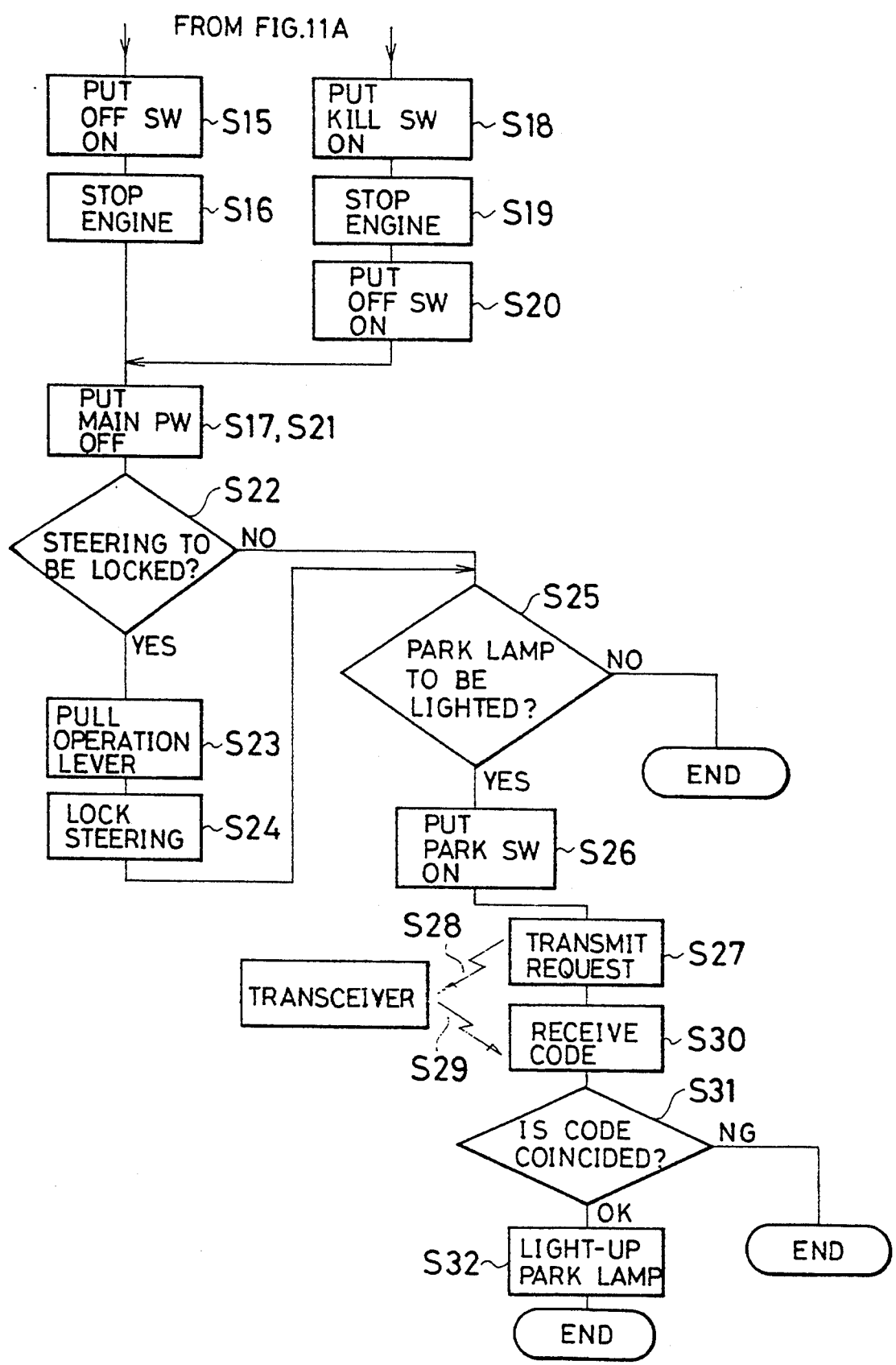

FIGS. 11A,B and FIG. 12 are, respectively, flow charts illustrating the operation of the embodiment shown in FIG. 10.

PREFERRED EMBODIMENTS OF THE INVENTION

The present invention will be described more specifically by way of its preferred embodiments with reference to the accompanying drawings.

FIGS. 1 through 5 illustrate a preferred embodiment according to the first invention of the present application applied to a motorcycle.

FIGS. 6 through 12 illustrate a preferred embodiment according to the second invention of the present application applied to a motorcycle.

Figure 1:
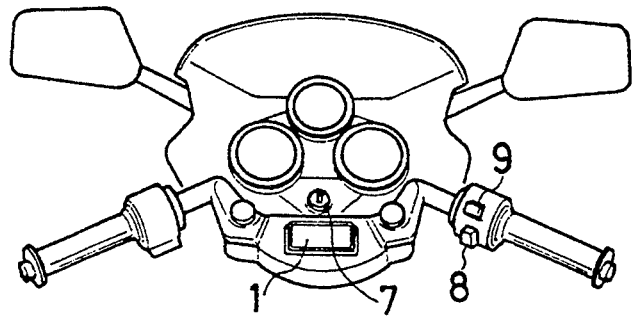
Figure 2:
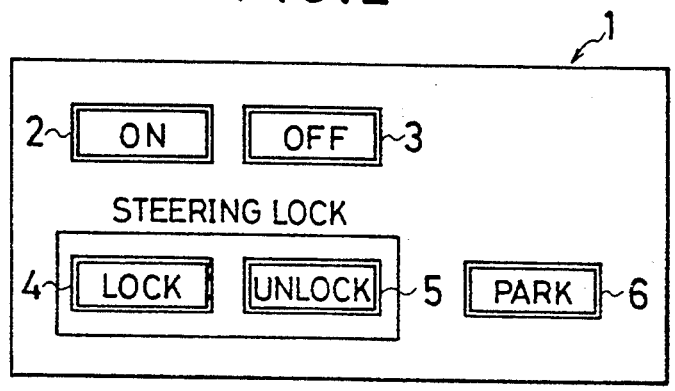
FIG. 2 is an explanatory view for the arrangement of a switch panel disposed 'to the handlebars shown in FIG. 1.

FIG. 1 illustrates the steering handlebars of a motorcycle to which the present invention is applied. On an operation switch panel 1 disposed on a top bridge of the handlebars, there are arranged various operation switches such as an ON switch 2 and an OFF switch 3 for an electric power supply circuit for a vehicle running system, a locking switch 4 and an unlocking switch 5 for a steering lock device, and a parking lamp switch 6 as shown also in FIG. 2. Further, a slot for the insertion of a mechanical key switch 7 is formed at a position adjacent to the operation switch panel 1, and an engine switch 8 and a kill switch 9 are both disposed near a handle grip.

Figure 3:
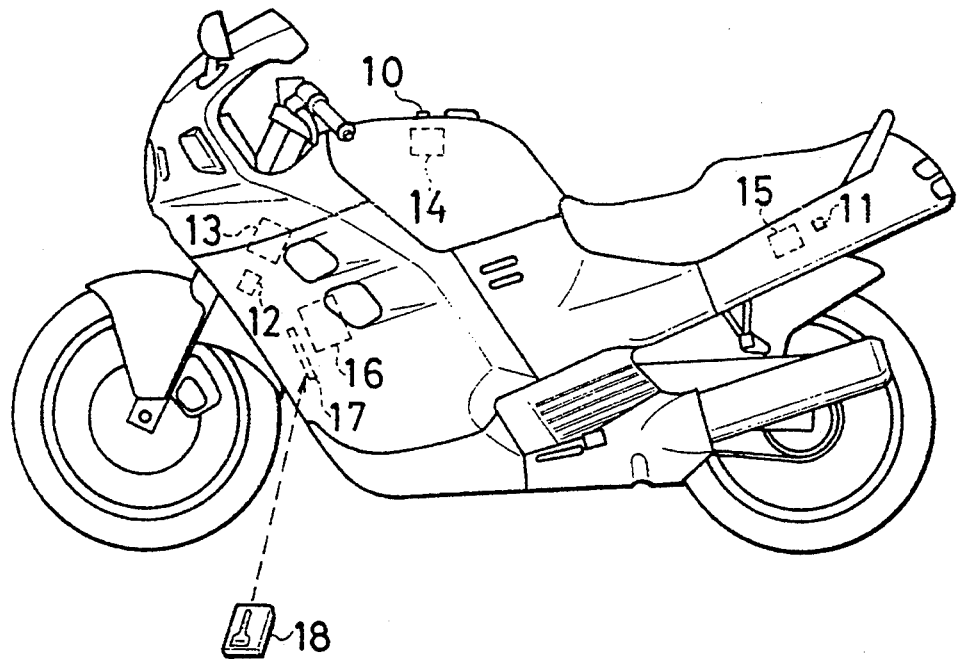
FIG. 3 is a perspective view illustrating a motorcycle to which the first invention of the present application is applied.

As shown in FIG. 3, a fuel port unlock switch 10 is disposed near a fuel port on a fuel tank and a helmet holder unlock switch 11 is disposed near a rear seat. A steering angle sensor 12 for detecting the steering angle of the handle bars and an actuator 13 for driving the steering lock device are disposed at a position adjacent to a front fork pivot portion, and a fuel port unlock actuator 14 and a helmet holder unlock actuator 15 are disposed near the corresponding locks. An antenna 17 is disposed at an appropriate position of a vehicle body so as to transmit and receive signals between a control unit 16 for controlling the actuators and a code transmitter, described later.

Figure 4:
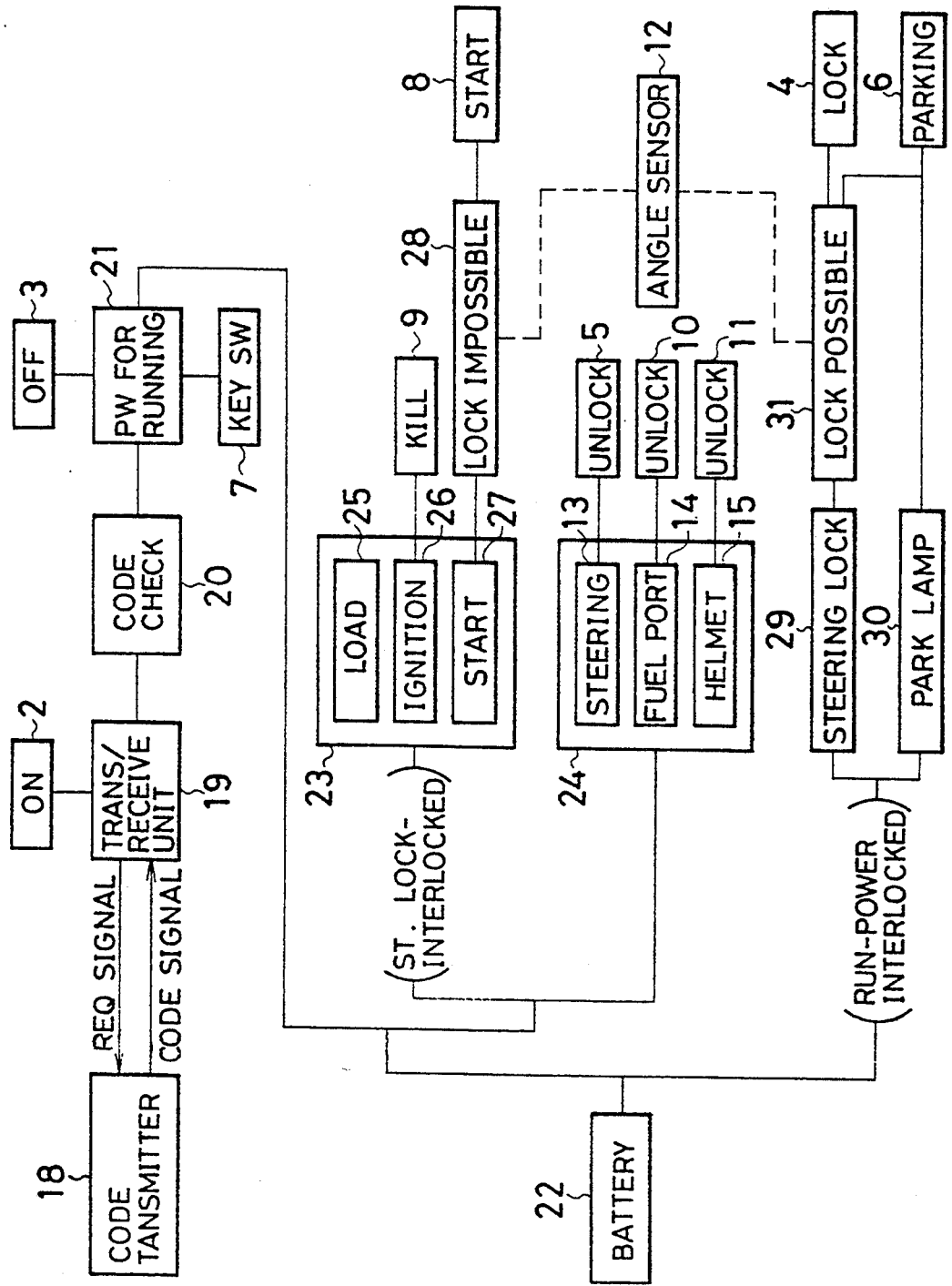
FIG. 4 is a block diagram illustrating the outline of the electric power supply control device for a vehicle according the first invention.

FIG. 4 is a block diagram illustrating the constitution of an electric power supply control device for a vehicle according to the present invention. The device has the function of transmitting and receiving code signals between the device main body and a code transmitter 18 comprising, for example, an IC card carried by a driver to identify whether a person who operates the card is a right user of the vehicle. The device comprises a transmitting/receiving circuit 19 that generates a request signal when the ON switch 2 on the operation switch panel 1 is pressed and receives a code signal transmitted from the code transmitter 18 in response to the request signal, and a code comparison circuit 20 that compares the code signal received by the transmitting/receiving circuit 19 with a predetermined reference code previously set within the circuit.

The code comparison circuit 20 is connected to an electric power supply circuit 21 for vehicle running system. The power supply circuit 21 is connected to a battery power source 22 by an on instruction signal generated from the code comparison circuit 20 when the signal code coincides with the reference set code. The power supply circuit 21 is so adapted that it can be disconnected from the battery power source 22 by the operation to the OFF switch 3 on the operation switch panel 1, and it can also be operated by the mechanical key switch 7, so that the vehicle can be operated with no problems even if the circuit relating to the comparison of the codes should happen to fail.

The electric power supply circuit 21 is connected to a running circuit 23 and an unlock actuator circuit 24.

The running system circuit 23 comprises a load circuit 25 for each of various lamps or alarms, an ignition circuit 26, and a start circuit 27, in which the ignition circuit 26 is connected to a kill switch 9 and the start circuit 27 is connected to a start switch 8 by means of a lock-disabling position detection circuit 28 connected to the output of the steering angle sensor 12. In this embodiment, the lock-disabling position detection circuit 28 and the start switch 8 are connected in series to the start circuit 27 and are adapted in such a way that the engine can be started only when the start switch 8 is pressed in a state where the handle bars are in a position other than a lock-enabling position. Further, the running system circuit 23 is interlocked with a steering locking circuit 29 to be described later in such a way that the running system circuit 23 is not actuated in a state where the steering lock is enabled.

The unlocking actuator circuit 24 comprises electromotive actuators 13, 14 and 15 connected to the steering unlocking switch 5, the fuel port unlocking switch 10 and the helmet holder unlocking switch 11, respectively, and each of the actuators is actuated in response to the operation of the switch which unlocks the corresponding actuator.

The steering locking circuit 29 and a parking lamp circuit 30 are connected to the battery power source 22 and are also interlocked with the running system circuit 23. The steering locking circuit 29 is connected to the steering locking switch 4 by means of a lock-enabling position detection circuit 31 connected to the output of the steering angle sensor 12 and is so adapted that when the steering locking switch is pressed and the handle bars are in the lock-enabling possible position, the actuator used in common with the steering lock actuator 13 described above is actuated in a manner to lock the handlebars.

A parking lamp circuit 30 is connected to the parking lamp switch, and the parking switch 6 is also connected in parallel to the steering locking circuit 29 by means of a lock-enabling position detection circuit 31 connected to the output circuit 31 of the steering angle sensor 12, so that the steering lock is locked at the same time with the pressing of the parking lamp switch 6.

As described above, the steering locking circuit 29 and the parking lamp circuit 30 are interlocked with the running system circuit 23 in such a way that locking for the handlebars lock and the lighting of the parking lamp are inhibited in a state wherein the running system circuit 23 is actuated.

Figure 5:
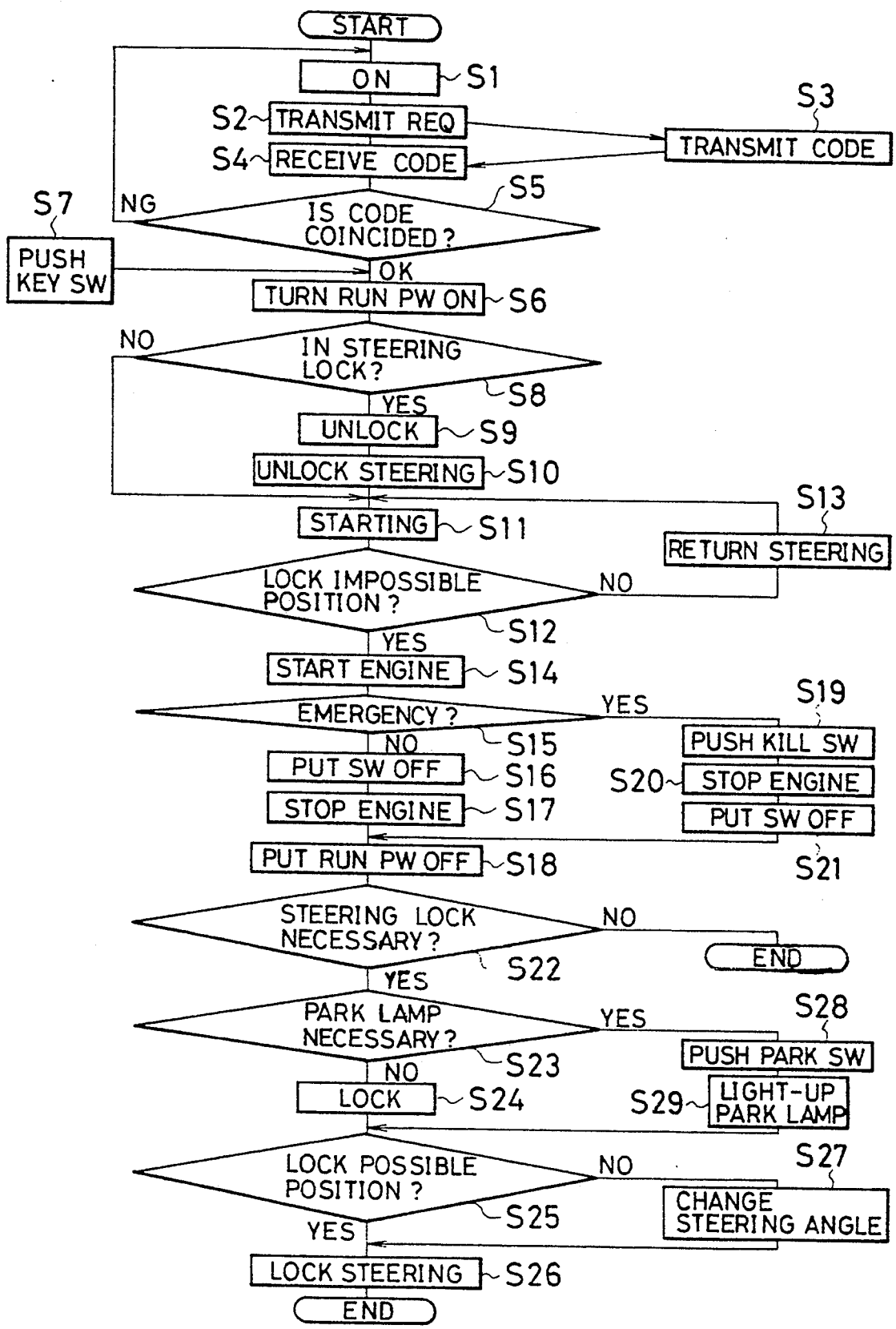
FIG. 5 is a Flow chart showing the operation of the device according to the invention.

The operation of the device according to the present invention will now be described with reference to FIG. 5.

At first, the driver presses the ON switch 2 disposed on the operation switch panel 1 (S1). In response to this pressing, the transmitting/receiving circuit 19 incorporated in the control unit 16 disposed in the vehicle transmits, on a radio wave, a request signal at a predetermined frequency for a predetermined period of time (S2). When the signal is received by the card-like code transmitter 18 carried by the driver, the code transmitter 18 transmits a specific code signal a predetermined number of times (S3).

Then, the code signal is received by the transmitting/receiving circuit 19 (S4) and compared with a code previously set to the code comparison circuit 20 (S5). If the received signal code coincides with the set reference code, the power supply circuit 21 for vehicle running system is turned on and the ON switch 2 is illuminated (S6). The power supply circuit 21 can be turned on manually also by the key switch 7 (S7).

Subsequently, the system determines whether the steering handlebars are locked (S8). If they are in the locked state, the driver presses the steering unlocking switch 5 on the operation panel 1 (S9). This causes an actuation instruction to be generated with respect to the steering lock actuator 13 for a predetermined period of time (unlocking operation), by which a lock pin for inhibiting relative rotation between a front fork and a head pipe is displaced to release the steering lock (S10).

The driver then presses the start switch 8 disposed near the handlebar grip (S11). At this point, the system determines whether the handlebars are situated at a lock-disabling position according to the output Frown the steering angle sensor 12 (S12). Since the engine will not start if the handlebars are not at the lock-disabling position, the driver returns the handlebars to the lock-disabling position (S13) and then again presses the start switch 8. Now when the system determines that the handlebars are at the lock-disabling position at step 12 (S12), the engine starts (S14).

The engine is stopped in accordance with the judgement as to whether it is a normal stop or an emergency stop (S15). In a normal stop, the OFF switch 3 is pressed (S16). Then, the engine stops (S17), and also the electric power supply circuit 21 for vehicle running is turned off and the lamp for the ON switch 2 is extinguished (S18). On the other hand, in an emergency stop, when the kill switch 9 is pressed (S19), the engine is immediately stops (S20). Subsequently, when the driver presses the OFF switch 3 (S21), the power supply circuit 21 is turned off (S18). Then, it is judged whether the locking for the handlebars is required (S22). If the locking is not necessary, the state is maintained as it is.

If the handlebars are to be locked, the locking is done in accordance with a judgement whether it is necessary to light the parking lamp (S23). If it is not necessary for light the lamp, the driver presses the steering lock switch (S24). The steering angle sensor 12 determines whether the handlebars are turned to the lock-enabling position (S25). If they are at the lock-enabling position, an actuation instruction is issued to the steering lock actuator 13 for a predetermined period of time (S26), by which the lock pin is protruded to lock the handlebars. If the handlebars are at the lock-disabling position, the lock instruction is automatically held until the handlebars are turned to the lock-enabling possible position. When the handlebars reach the lock-enabling position, they are locked (S27).

On the other hand, if the parking lamp switch 6 is pressed (S28), the parking lamp is lit (S29), then the system determines the steering angle in step (S25). Subsequently, the handlebars are locked in the same procedure as described above.

When the power supply circuit 21 for vehicle running is on, the helmet holder and the fuel charging port can be unlocked, individually, by the corresponding operation switches 10 and 11 disposed near the lock actuators.

Instead of self-holding the lock instruction, the system may also be so constituted that the lock instruction is accepted only when the handlebars are at the lock position.

In the embodiment of the present invention, since the lock actuator used for locking the handlebars are remote-controlled, it is possible to dispose the steering lock device at such a position as not easily accessible.

As has been described above specifically for the illustrated embodiment of the present invention, locking and unlocking operations of the steering lock can be achieved by merely pressing switches disposed on the vehicle. Therefore, key operations are no longer necessary, which dramatically improves the operability. In addition, since the engine will not start if the handlebars are not at the lock-disabling position, it is easy for the driver to manipulate the lock without taking care of the status of the lock. In the steering lock device of this invention using electromotive actuators, etc., the operation of starting the engine can be completed in a shorter period of time, while providing a function comparable with that of a conventional key switch integrated with a steering lock, thereby attaining a further improved ease of operation.

Description will be made to the second invention of the present application applied to a motorcycle with reference to FIGS. 6 to 12.

Figure 6:
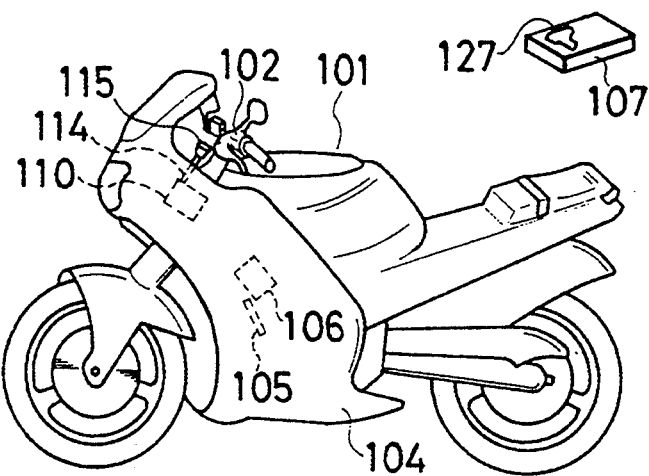
FIG. 6 is perspective view for a portion of a motorcycle to which the second invention off the present application is applied.
Figure 7:
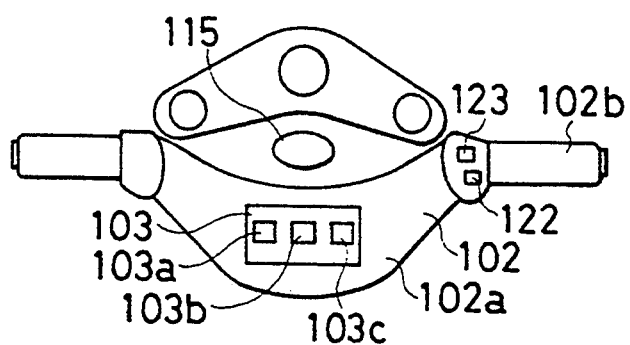
FIG. 7 is a front elevational view of handlebars for the motorcycle shown in FIG. 6.

As shown in FIGS. 6 and 7, a vehicle 101 has handlebars 102, and a main board 103 is disposed on a top bridge 102a at the middle portion of the handlebars 102. An ON switch 103a, an OFF switch 103b, and a parking switch 103c are arranged on the main board 103. Further, a start switch 122 and a kill switch 123 are disposed near a handle grip 102b. Further, a transmitting-/receiving unit 106 having an antenna 105 is disposed to the inner side of a cowl 104 and so adapted that it transmits a request signal at a predetermined frequency from the antenna 105 by pressing the OFF switch 103a of the parking switch 103c of the main board 103.

A small sized transceiver 107 that can be carried about in a pocket, etc. of a driver is combined in a wireless mode with the transmitting/receiving unit 106, and adapted such that when a request signal transmitted from the antenna 105 is received by the transceiver 107, the transceiver 107 transmits a code signal inherent to the driver. When the code signal is received on the antenna 105 of the transmitting/receiving unit 106 and it coincides with a predetermined set code described later, a coincidence signal is outputted.

A steering lock actuator 110 is incorporated near the main board 103 of the vehicle 101 and adapted so that the handlebars 102 can be locked or unlocked by the actuator.

Figure 8:
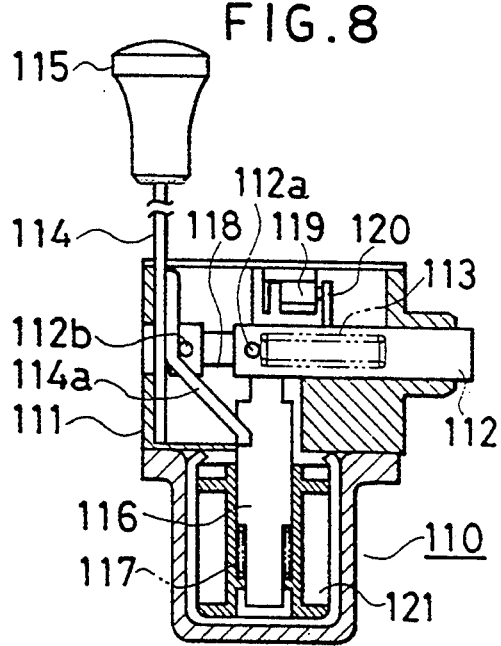
FIG. 8 is a vertical cross sectional view of a steering lock actuator used in the device of the invention.
Figure 9:
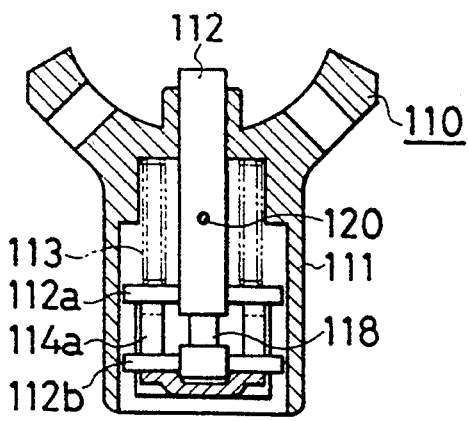
FIG. 9 is a horizontal cross sectional view of a steering lock actuator used in the device of the invention.

As shown in FIGS. 8 and 9, a lock pin 112 is disposed within a casing 111 for the steering lock actuator 110 slidably in the lateral direction in FIG. 8. First and second rods 112a, 112b are secured to the lock pin 112 in perpendicular to the axial line of the pin. A compressed spring 113 is held between the first rod 112a situated near the center of the lock pin 112 and the inner wall of the casing 111 (also refer to FIG. 9), by which the lock pin 112 is always biased resiliently to the inside of the casing 111. An operation lever 114 has a knob 115 formed at one end and being protruded to the outside of the vehicle (refer to FIG. 6). The other end of the lever 114 has a cam 114a generally of a V-shaped configuration. The cam 114a is engaged with the second rod 112b situated near one end of the lock pin 112. With such a constitution, when the operation lever 114 is pulled, the lock pin 112 can protrude outwardly of the casing 111 against the resilient force of the spring 113 to lock the handlebars 102. Further, a plunger 116 is disposed within the casing 111 slidably in the vertical direction in FIG. 8, and the plunger 116 is always biased resiliently by the spring 117 toward the lock pin 112. The lock pin 112 has an engaging groove 118 formed between the first rod 112a and the second rod 112b, so that the lock pin 112 can be held at the locked position by engaging the top end of the plunger 116 into the engaging group 118. A lock detection switch 119 is disposed near the lock pin 112 in the casing 111 and the lock detection switch 119 is adapted in such a way that it is turned off when urged by a lever 120 secured to the lock pin 112. The plunger 116 can be attracted by a solenoid 121 and the handlebars 102 can be unlocked by attracting the plunger 116 to release the engagement between the plunger 116 and the lock pin 112.

As shown in FIG. 10, the ON switch 103a, the OFF switch 103b, and the parking switch 103c on the main board 103 are connected to the transmitting/receiving unit 106. The transmitting/receiving unit 106 has a transmission circuit 106a and a receiving circuit 106b connected to the antenna (105 in FIG. 6).

The unit 106 further comprises a comparison circuit 106c for comparing the signal code transmitted from the transceiver 107 with a predetermined code set in a circuit 106d. The transmitting/receiving unit 106 is connected to a main power supply 109 by way of a main relay 124.

When the ON switch 103a is pressed and the code signal of the transceiver 107 coincides with the set code of the transmitting/receiving unit 106 as a result of comparison made in the circuit 106d, a coincide signal is generated from the transmitting/receiving unit 106, by which the main relay 124 is energized to connect the main power supply 109 with a battery power source 125 and thus the power supply is turned on. On the other hand, the main power supply 109 is disconnected from the battery power source 125 by pressing the OFF switch 103b thereby de-energizing the main relay 124. An emergency switch 126 is connected in parallel with the main relay 124, so that the main power supply 109 can also be turned on and off by opening and closing the emergency switch 126 by a mechanical key 127 (refer to FIG. 6) attached to the transceiver 107 (refer to FIG. 6).

The start switch 122 and the kill switch 123 are disposed in parallel with each other and connected to the main power supply 109. The kill switch 123 is connected by way of ignition coils 130 to an ignition unit 131. When the start switch 122 is depressed in a state when the main power supply 109 is ON, the engine is started.

In a case if it is detected by an ignition monitor circuit 133 disposed to the ignition unit 131 that the engine is stopped and that the main power supply 109 still remain on, a request signal at a predetermined frequency is transmitted from the transmitting/receiving unit 106 by way of the transmission circuit 106a on every predetermined time to the transceiver 107. If normal communication is not taken place between the transmitting-/receiving unit 106 and the transceiver 107 continuously for a predetermined period of time, the unit 106 deenergizes the main relay 124 to automatically turn off the main power supply 109.

The main relay 124 is connected with the solenoid 121 in the steering lock actuator 110 and the solenoid 121 is connected to the connection switch 119. Thus, when the main relay 124 is energized in a state where the lock detection switch 119 is ON, the solenoid 121 is energized. Further, the lock detection switch 119 is connected by way of an ignition control unit 132 to the ignition unit 131, so that if the lock detection switch 119 is turned on upon starting the engine by pressing the start switch 122, a reducing signal is sent from the ignition control unit 132 to the ignition unit 131 to inhibit the engine from being ignited normally.

Further, an ignition monitor circuit 133 is connected to the ignition unit 132 so that the transmitting/receiving unit 106 can detect the stop of the engine under the status where the main power supply 109 remains on.

The transmitting/receiving unit 106 is connected by way of a parking relay 128 to a parking lamp 129, so that when the parking switch 103c is pressed and the code signal from the transceiver coincides with the code set to the circuit 106d, a coincide signal is generated from the transmitting/receiving unit 106 to energize the parking relay 128 and light the parking lamp 129. The parking lamp 129 can be lit only when the main power supply 109 is OFF, and it is extinguished when the main power supply 109 is turned on.

The operation of this embodiment according to the present invention having constitution as has been described above will be explained while referring to FIGS. 10 through 12.

At first, when the driver presses the ON switch 103a on the main board 103 (S1), the transmitting/receiving unit 106 disposed in the vehicle 101 transmits a request signal at a predetermined frequency for a predetermined period of time in response to this pressing from the transmission circuit 106a by way of the antenna 105 (S2). When the request signal is received by the card-like transceiver 107 carried by the driver (S3), the transceiver 107 automatically transmits a code signal inherent to the driver for a predetermined number of times (S4). Then, the code signal is received by way of the receiving circuit 106b to the transmitting/receiving unit 106 (S5) and compared by the comparison circuit 106c with a predetermined code previously set to the circuit 106d (S6). Then, when the code signal coincides with the set code, the main relay 124 is energized to turn the main power supply 109 to ON (S7).

If radiowave communication is not possible due to the exhaustion of an electric cell contained in the transceiver 107 or by the failure of the transmitting/receiving unit 106, it is also possible to turn on the main power supply 109 by turning on the emergency switch 126 by the manipulation to the mechanical key 127 disposed in the transceiver 107 (S8), (S9).

When the main power source 109 is turned on in a state where the handlebars 102 are is locked, the solenoid 121 in the steering lock actuator 110 is energized to attract the plunger 116. Then, engagement between the plunger 116 and the lock pin 112 is released and the lock pin 112 is withdrawn to the inside of the casing 111 by the resiliency of the spring 110, by which the handlebars 102 are unlocked (S10). When the lock pin 112 is thus withdrawn to the inside of the casing 111, the lever 120 secured to the lock pin 112 urges the lock detection switch 119 thereby turning off the lock detection switch 110. Thus, the solenoid 121 is deactivated and the plunger 116 is protruded by the resiliency of the spring 117 and held at the circumferential surface of the lock pin 112.

Then, the start switch 112 disposed near the handle grip 102b is depressed (S11).

Upon starting the engine, when the handlebars 102 are detected to be normally unlocked by the output of the lock detection switch 119, the engine is ignited normally (S12). On the other hand, if the handlebars 102 are not unlocked normally and the lock detection switch 119 is kept ON, a reducing signal is sent from the ignition control unit 132 to the ignition unit 131 thereby inhibiting the engine from being ignited normally (S13).

The engine stops in accordance with the judgement whether it should be stopped normally or immediately. Upon normal stop, when the OFF switch 103b on the main board 103 is pressed (S15), the engine stops (S16) and the main power supply 109 turns off (S17). On the other hand, in an emergency stop, when the kill switch 123 disposed near the handle grip 102b is depressed (S18), the engine immediately stops (S19). Subsequently, when the OFF switch 103b on the main board 103 is pressed (S20), the main relay 124 turns off and the main power supply 109 is also turned off (S21).

Then, it is judged whether it is necessary to lock the handlebars 102 (S22). If the handlebars 102 are to be locked, the handlebars 102 are turned to a locking position and then the operation lever 114 disposed to the steering lock actuator 110 is pulled (S23), by which the lock pin 112 protrudes outwardly of the casing 111 and the plunger 116 engages the engaging groove 118 of the lock pin 112 by the resiliency of the spring 117 to lock the handlebars 102 (S24).

Then, the system judges whether it is necessary to light up the parking lamp 129 (S25). If the parking lamp 129 is to be lit, the parking switch 103c on the main board is pressed (S26). In response to the pressing, the transmitting/receiving unit 106 disposed to the vehicle 101 at first transmits a request signal at a predetermined frequency for a predetermined period off time (S27). When the request signal is received by the transceiver 107 carried by the driver (S28), the transceiver 107 transmits a code signal inherent to the driver a predetermined number of times (S29). Then, the code signal is received by the transmitting/receiving unit 106 (S30) and compared with the code set in the circuit 106d (S31). Then, if the code signal and the set code coincide with each other, the parking relay 128 is energized to lit the parking lamp 129 (S32).

In this embodiment, when the main power supply 109 remains ON, it is judged by the ignition monitor circuit 133 as to whether the engine is in rotation or stops (S33). The period duping which the engine stops is judged (S34) and, if the engine stops for more than 1 minute, a request signal at a predetermined frequency is transmitted from the transmitting/receiving unit 106 by way of the transmission circuit 106a to the transceiver 107 on every one minute (S35) When the request signal is received by the transmitter 107 carried by the driver (S36), the transmitter 107 transmits a code signal inherent to the driver a predetermined number of times (S37). Then, the code signal is received by way of the receiving circuit 106b to the transmitting/receiving unit (S38) and compared with the set code in the circuit 106d (S39). Then, when the code signal coincides with the set code, the main power supply 109 is kept ON as it is (S40).

On the other hand, if the code signal from the transceiver 107 is not received by the transmitting/receiving unit 106 after the request signal has been transmitted from the transmitting/receiving unit 106 (that is, when the driver is away from the vehicle), the main power supply 109 is automatically turned OFF (S41).

As has been described above, in accordance with the present invention, wireless communication is conducted between the card-like transceiver carried by the driver and the transmitting/receiving unit disposed on the vehicle on every predetermined time in a state when the main power supply remains ON and the engine stays stopped. Then, if normal wireless communication can not be taken place over a predetermined period of time between them, the main power supply is turned OFF automatically. Therefore, wasteful consumption off electric power can be prevented in a case where the engine is stopped by direct operation to the kill switch or by accident (engine trouble) and the driver gets off the vehicle while forgetting to disconnect the main power supply.

What is claimed is:

1. An electric power supply control device for a vehicle comprising:
   a steering lock circuit for actuating a lock actuator for driving a steering lock device of a vehicle,
   a circuit for a vehicle running system for actuating an engine of said vehicle,
   a power supply circuit for supplying electric power to said steering lock circuit and said circuit for the vehicle running system,
   a locking operation switch for outputting an operation instruction signal for actuating said lock actuator in the direction of locking said steering lock device,
   a code transmitter means carried by a driver for transmitting a predetermined inherent code signal upon receiving a predetermined request signal,
   a transmitting/receiving circuit disposed on the vehicle for transmitting said predetermined request signal to said code transmitter means and for receiving said predetermined inherent code signal transmitted from said code transmission means,
   a code comparison circuit for comparing said received predetermined inherent code signal with a predetermined code previously stored in said code comparison circuit,
   a running operation switch means disposed on the vehicle for actuating said transmitting/receiving circuit and connecting said vehicle running system circuit with said power supply circuit when said received inherent code signal coincides with said stored predetermined code, and
   an off switch disposed on the vehicle to be operated for disconnecting said power supply circuit for vehicle running from a power source and turning said power supply circuit to off,
   wherein said circuit for vehicle running system and said steering lock circuit are connected to a power supply circuit so that said running system circuit cannot be actuated when said steering lock circuit is enabled and said steering lock circuit cannot be actuated when said running system circuit is enabled.

* * * * *